Figure 1:
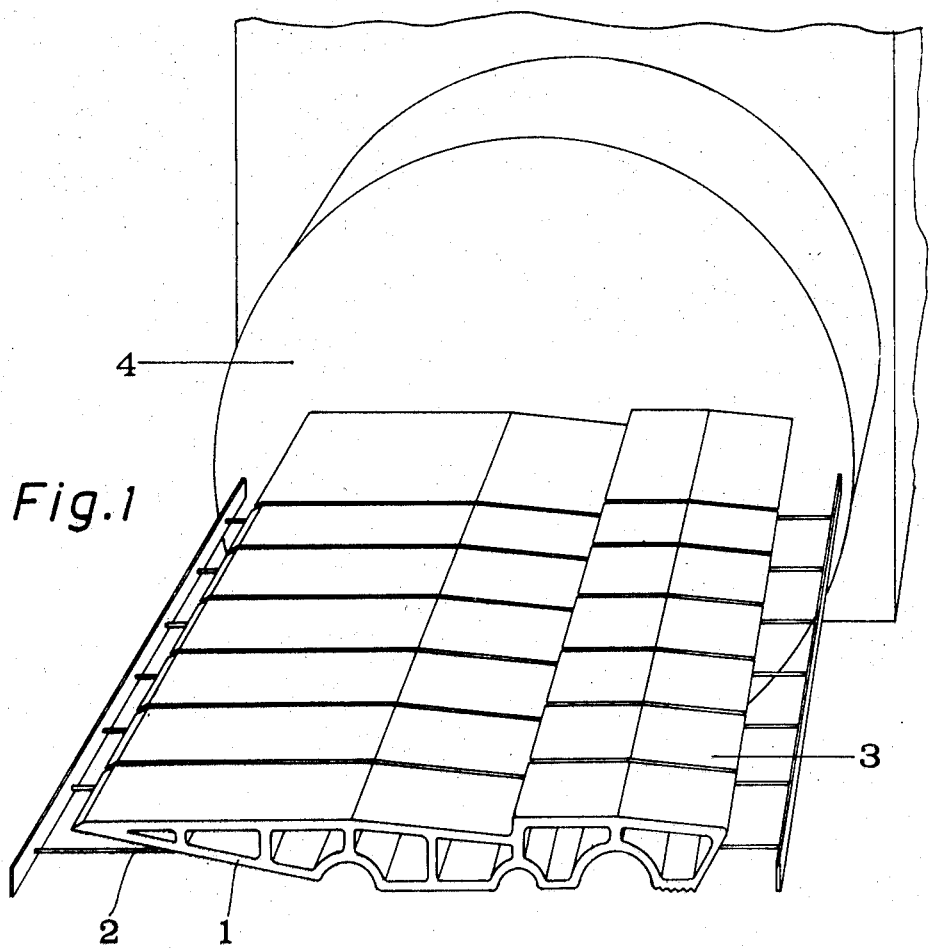

United States Patent [19]
D'Eugenio

[11] 3,832,757
[45] Sept. 3, 1974

[54] PROCESS FOR PRODUCING CLOTHES-PINS BY EXTRUSION OF PLASTIC MATERIAL AND THE CLOTHES PINS OBTAINED

[76] Inventor: Benito D'Eugenio, Via Maurisio 13, Vicenza, Italy

[22] Filed: Mar. 20, 1973

[21] Appl. No.: 343,009

[30] Foreign Application Priority Data
Mar. 20, 1972  Italy ........................ 85538/72

[52] U.S. Cl. ............................................. 24/137 A
[51] Int. Cl. ............................................... D06f 55/00
[58] Field of Search ........ 24/137 A, 137 R, 255 GP, 24/137, 201 C; 150/3; 229/62

[56]  References Cited
UNITED STATES PATENTS
1,368,839   2/1921   Richards .................. 24/137 A UX
1,435,674   11/1922  Varga ...................... 24/137 A
2,788,039   4/1957   Schjeldahl ................. 150/3
3,219,084   11/1965  Ausnit et al. ............. 24/201 C X
3,411,419   11/1968  Becker et al. ............. 229/62 X
3,592,428   7/1971   McFarlane ................ 24/201 C UX
3,629,912   12/1971  Klopp ..................... 24/255 SL FOREIGN PATENTS OR APPLICATIONS
207,775   2/1966   Sweden .................... 24/137 R Primary Examiner—Donald A. Griffin
Attorney, Agent, or Firm—Paul & Paul

[57]  ABSTRACT

A process for producing clothes-pins and a clothes-pin formed by the extrusion of a strip of plastics material, transversely cutting said strip into a plurality of clothes-pin elements and assembling said elements in pairs to form a clothes-pin.

3 Claims, 2 Drawing Figures

PATENTED SEP 3 1974 3,832,757

PROCESS FOR PRODUCING CLOTHES-PINS BY EXTRUSION OF PLASTIC MATERIAL AND THE CLOTHES PINS OBTAINED

This invention relates to a process for producing clothes-pins by extrusion of plastics material and the clothes-pins obtained by this process. This process permits a substantial reduction of the production cost of clothes-pins.

The conventional clothes-pins of plastics material now in use are formed by a pair of like elements fastened together and produced by injection of plastics material into multiple dies. This involves a discontinuous production process which reduces the amount of the produced clothes-pins and does not permit to use economically certain plastics materials such as PVC and others which are best suited for making clothes-pins as they resist better than other plastics materials to the effects of irradiation of the sun and adverse weather conditions to which clothes-pins are often subjected.

It is an object of the present invention to provide a continuous process for the production of clothes-pins elements from which the clothes-pins themselves are assembled, which process permits to considerably reduce the production cost of clothes-pins and particularly permits to use a reticulate grid-like structure for the clothes-pin elements with consequent saving of the amount of plastics material required and nevertheless providing clothes-pins of a high strength and resilience and permitting the use of plastics materials which are best suited for the production of clothes-pins.

The process according to the invention comprises the extrusion of a strip of plastics material having the profile of a clothes-pin element, cutting said strip of plastics material transversely of the longitudinal axis thereof to produce an individual clothes-pin element and assembling said individual clothes-pin elements in opposed pairs to produce a finished clothes-pin.

Cutting of the strip of plastics material may advantageously be effected by a hot wire multiple cutter. This provides the advantage that along the cutting edges of the plastics material small thickened seams are formed by softening of the plastics material, which tend to increase the bending strength of the clothes-pin elements.

However, cutting of the extruded strip of plastics material may also be effected by other methods, for example, by a multiple milling cutter.

The strips of plastics material may also be shipped as semifinished products to the works for finishing the clothes-pin elements, which are equipped with the cutting and automatic assembling machines, so that the latter operations are carried out independently of and without need of synchronism with the extruder.

The width of the clothes-pin elements may easily be varied by changing the spacing between the cutting elements of the multiple cutter. In this manner, for example, paper fasteners for office use may be produced by cutting the fastener elements to a considerable width.

Figure 2:
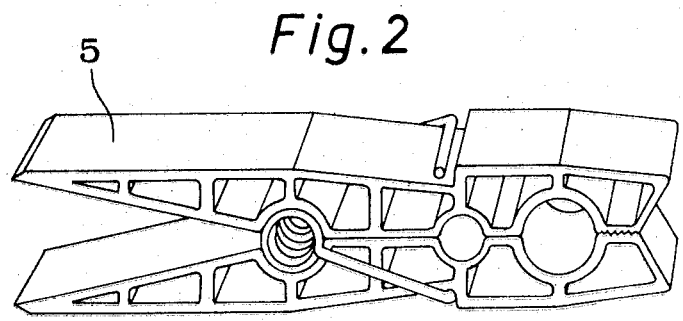

A preferred embodiment of the invention will now be described by way of example and with reference to the accompanying drawing, in which:

FIG. 1 is a perspective view of an extruded strip of plastics material having the profile of a clothes-pin element and cut by a multiple cutter according to the process of the present invention and FIG. 2 is a perspective view of a clothes-pin assembled from the elements shown in FIG. 1.

As shown in FIG. 1, the clothes-pin elements 1 are produced by transversely cutting an extruded strip 3 of plastics material, for example, by means of a hot wire multiple cutter 2 the wires of which may be heated, for example, by electric current, the extruded strip 3 having the profile of a clothes-pin element and being extruded by an extruder 4.

In the illustrated embodiment the clothes-pin element 1 has a reticulate grid-like structure with a plurality of profiled recesses which reduce its weight and increase its resilience as well as its strength and permit to save a considerable amount of plastics material.

During cutting of the plastics material by the hot wire cutter the plastics material is softened and tends to form thickened seams at the edges of the cut clothes-pin element, the seams having the form of ribs which add to the bending strength of the clothes-pin elements.

When the elements 1 are assembled in opposed pairs a complete clothes-pin 5 is formed, as shown in FIG. 2.

The clothes-pin elements 1 may evidently also be formed without recesses and may also be made of foamed plastics or any other appropriate material, even a non-thermoplastic material, for example, a conglomerate extruded heat- or cold-setting material, polyester or other resin or a ferrous or non-ferrous metal.

The proposed process permits a continuous completely automated production and thus helps to reduce the cost of the finished product.

Further, the clothes-pin elements are produced by the present process in a continuous orderly and regular series which facilitates subsequent assembly and packaging of the clothes-pins by completely automated installations.

Although a preferred embodiment of the invention has been described herein in detail and illustrated in the accompanying drawing, it is to be understood that the invention is not limited to this precise embodiment, particularly with respect to the form and profile of the clothes-pin elements shown in the drawing, and that numerous changes and modifications may be made therein without departing from the scope of the invention.

I claim:

1. A process for manufacturing elements of clothes-pins of the type comprising two similarly shaped elongated elements and a coil spring resiliently maintaining the elements in assembled relationship, the process comprising:

extruding a strip of plastics material, having the profile of a clothes pin element, and
   cutting with a hot wire multiple cutter said strip of plastics material transversely to the longitudinal axis thereof to produce an individual clothes pin element having ribs produced by melted, displaced and subsequently solidified plastics material along the edges of the element where the strip has been cut.

2. The process of claim 1, wherein the strip of plastics material comprises an outside mantle in the shape of said profile, and internal bracing webs integral with the mantle to form a reticulate grid-like structure.

3. A clothes-pin including elements extruded from a plastic strip of reticulate structure and having ribs produced by melted, displaced and subsequently solidified plastics material along the edges of the elements.

* * * * *